2,723,290

PROCESS FOR THE CRYSTALLIZATION OF 2-HYDROXY-3-NAPHTHOIC ACID

David X. Klein, Upper Montclair, and George W. Benz, Garfield, N. J., assignors to Heyden Chemical Corporation, New York, N. Y., a corporation of Delaware No Drawing. Application August 17, 1951,
Serial No. 242,418

10 Claims. (Cl. 260—520)

This invention relates to 2-hydroxy-3-naphthoic acid and more particularly, to a process for the preparation of 2-hydroxy-3-naphthoic acid in crystalline form.

The conventional processes for the manufacture of 2-hydroxy-3-naphthoic acid involve the precipitation of the acid from an aqueous salt solution thereof such as for example, sodium salt of 2-hydroxy-3-naphthoic acid, by the addition of a strong mineral acid. The product is recovered in the form of flat, plate-like and extremely fine crystals. The aforesaid crystals are very small in size and have a strong tendency to give rise to a highly irritating dust. In addition, when the crystals that are prepared in the processes set forth above are dried, they tend to aggregate. The dried product is thus not free-flowing in nature.

It has now been discovered that 2-hydroxy-3-naphthoic acid can be prepared in the form of coarse, dustless crystals by a process which comprises precipitating the acid from a solution of its salt by the addition thereto of an organic acid having a dissociation constant ranging between $1.34 \times 10^{-5}$ to $6.3 \times 10^{-5}$.

In a more specific embodiment of this invention, 2-hydroxy-3-naphthoic acid is prepared in the form of coarse, dustless crystals by adding an organic acid having a dissociation constant ranging between $1.34 \times 10^{-5}$ to $6.3 \times 10^{-5}$ to a heated solution of an alkali metal salt of 2-hydroxy-3-naphthoic acid, thereby precipitating the acid in its desired form. The organic acid or, in those situations where the organic acids are solid at room temperature, an aqueous solution of the organic acid, is slowly added to an aqueous solution of sodium salt of 2-hydroxy-3-naphthoic acid which is maintained at a temperature ranging between 75°–100° C. The precipitation of 2-hydroxy-3-naphthoic acid begins at a pH of about 5 and continues as the pH is lowered depending on the strength of the acid used. The precipitated material is filtered off, washed with hot water, and dried to obtain 2-hydroxy-3-naphthoic acid in the form of coarse, dustless crystals.

The product obtained by the procedure described above is free-flowing in nature and contains very little finely divided material. The product in this form is considered to be highly satisfactory for the various applications and uses of 2-hydroxy-3-naphthoic acid.

Some of the organic acids which can be used to precipitate 2-hydroxy-3-naphthoic acid in the desired crystalline form from salt solutions thereof include acetic acid (dissociation constant $1.8 \times 10^{-5}$), propionic acid ($1.34 \times 10^{-5}$), butyric acid ($1.5 \times 10^{-5}$), crotonic acid ($2.0 \times 10^{-5}$), benzoic acid ($6.3 \times 10^{-5}$), etc.

Additional advantages and features of this new and highly improved process are set forth in the following examples which disclose the principle of the invention and the preferred embodiment of applying that principle. It is understood, however, that the examples are merely illustrative and not limitative in nature, being capable of various other modifications.

Example I

Five hundred milliliters of an aqueous solution containing 22.8 grams of sodium salt of 2-hydroxy-3-naphthoic acid was heated to 90° C. Ten milliliters of glacial acetic acid was then added dropwise to the warm solution, thereby precipitating the 2-hydroxy-3-naphthoic acid. During the addition of the acetic acid, the pH of the solution fell from 4.5 to 3.6.

The large crystals of 2-hydroxy-3-naphthoic acid were collected, washed with hot water, and dried. The crystals were bright yellow in color and substantially completely free from finely-divided dusty material.

Example II

A 250 milliliter sample of a solution which contained 8.9 grams of sodium salt of 2-hydroxy-3-naphthoic acid was heated to 75° C. Twenty milliliters of propionic acid was then added dropwise thereto. The precipitated material was collected, washed with warm water, and dried. The product consisted of substantially free-flowing, dustless crystals.

Example III

Ten milliliters of butyric acid was added dropwise to 250 milliliters of an aqueous solution of potassium salt of 2-hydroxy-3-naphthoic acid which had previously been heated to 75° C. The precipitated material, after washing and drying, consisted of free-flowing, dustless crystals.

Example IV

Two hundred and fifty milliliters of a solution of sodium salt of 2-hydroxy-3-naphthoic acid was heated to 75° C. One hundred milliliters of a 10% aqueous solution of crotonic acid was added slowly to the sodium salt of 2-hydroxy-3-naphthoic acid solution thereby precipitating 2-hydroxy-3-naphthoic acid. After washing and drying, the product consisted of large, free-flowing crystals.

Example V

Two hundred milliliters of an aqueous solution containing 8.9 grams of sodium salt of 2-hydroxy-3-naphthoic acid was decolorized by the addition of a small amount of sodium hydrosulfite. The solution was heated to boiling and to it was added a solution of 10 grams of benzoic acid in 300 milliliters of boiling water. The resulting clear solution was cooled to 95° C. thereby precipitating the 2-hydroxy-3-naphthoic acid. The precipitated material was filtered off at 95° C., washed with 100 milliliters of boiling water, and dried. The product consisted of free-flowing crystals of 2-hydroxy-3-naphthoic acid and contained very little finely-divided material.

It is apparent from the foregoing that the invention is capable of various modifications and that, therefore, it is intended and desired to embrace within the scope of this invention such modifications and changes that are necessary to adapt it to varying conditions and uses, as defined by the scope of the appended claims.

We claim:

1. A process for preparing 2-hydroxy-3-naphthoic acid in the form of coarse and dustless crystals which comprises adding an organic acid having a dissociation constant ranging between $1.34 \times 10^{-5}$ to $6.3 \times 10^{-5}$ to an aqueous solution of an alkali metal salt of 2-hydroxy-3-naphthoic acid.

2. A process for preparing 2-hydroxy-3-naphthoic acid in the form of coarse and dustless crystals which comprises adding an organic acid having a dissociation constant ranging between $1.34 \times 10^{-5}$ to $6.3 \times 10^{-5}$ to an aqueous solution of an alkali metal salt of 2-hydroxy- 3-naphthoic acid, said aqueous solution being maintained at a temperature ranging between 75°–100° C.

3. A process for preparing 2-hydroxy-3-naphthoic acid in the form of coarse and dustless crystals which comprises adding acetic acid to an aqueous solution of an alkali metal salt of 2-hydroxy-3-naphthoic acid, said aqueous solution being maintained at a temperature ranging between 75°–100° C.

4. A process for preparing 2-hydroxy-3-naphthoic acid in the form of coarse and dustless crystals which comprises adding propionic acid to an aqueous solution of an alkali metal salt of 2-hydroxy-3-naphthoic acid, said aqueous solution being maintained at a temperature ranging between 75°–100° C.

5. A process for preparing 2-hydroxy-3-naphthoic acid in the form of coarse and dustless crystals which comprises adding butyric acid to an aqueous solution of an alkali metal salt of 2-hydroxy-3-naphthoic acid, said aqueous solution being maintained at a temperature ranging between 75°–100° C.

6. A process for preparing 2-hydroxy-3-naphthoic acid in the form of coarse and dustless crystals which comprises adding crotonic acid to an aqueous solution of an alkali metal salt of 2-hydroxy-3-naphthoic acid, said aqueous solution being maintained at a temperature ranging between 75°–100° C.

7. A process for preparing 2-hydroxy-3-naphthoic acid in the form of coarse and dustless crystals which comprises adding benzoic acid to an aqueous solution of an alkali metal salt of 2-hydroxy-3-naphthoic acid, said aqueous solution being maintained at a temperature ranging between 75°–100° C.

8. A process for preparing 2-hydroxy-3-naphthoic acid in the form of coarse and dustless crystals which comprises adding acetic acid to an aqueous solution of sodium salt of 2-hydroxy-3-naphthoic acid, said aqueous solution being maintained at a temperature ranging between 75°–100° C.

9. A process for preparing 2-hydroxy-3-naphthoic acid in the form of coarse and dustless crystals which comprises adding propionic acid to an aqueous solution of sodium salt of 2-hydroxy-3-naphthoic acid, said aqueous solution being maintained at a temperature ranging between 75°–100° C.

10. A process for preparing 2-hydroxy-3-naphthoic acid in the form of coarse and dustless crystals which comprises adding butyric acid to an aqueous solution of sodium salt of 2-hydroxy-3-naphthoic acid, said aqueous solution being maintained at a temperature ranging between 75°–100° C.

References Cited in the file of this patent

UNITED STATES PATENTS

| | | |
|---|---|---|
| 1,896,457 | Morschel et al. | Feb. 7, 1933 |
| 2,441,702 | Homeyer | May 18, 1948 |
| 2,531,380 | Higgins | Nov. 28, 1950 |

FOREIGN PATENTS

| | | |
|---|---|---|
| 366,140 | Great Britain | Feb. 1, 1932 |
| 200,670 | Switzerland | Jan. 16, 1939 |

OTHER REFERENCES

Strohback: Ber. Deut. Chem. vol. 34, p. 4143 (1901).
Lesser et al.: Ber. Deut. Chem., vol. 58, p. 2115 (1925).
MacArdle: Solvents in Synthetic Org. Chem. (Van Nostrand), pages 91–92 (1925).